United States Patent
Murayama et al.

(10) Patent No.: US 11,988,822 B2
(45) Date of Patent: *May 21, 2024

(54) MICROSCOPE

(71) Applicant: NIKON CORPORATION, Tokyo (JP)

(72) Inventors: Toru Murayama, Yokohama (JP); Atsushi Takeuchi, Tokyo (JP); Yumiko Ouchi, Yokohama (JP); Yuki Yoshida, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,101

(22) Filed: Mar. 2, 2020

(65) Prior Publication Data
US 2020/0225455 A1 Jul. 16, 2020

Related U.S. Application Data

(60) Division of application No. 13/604,524, filed on Sep. 5, 2012, now Pat. No. 10,613,309, which is a
(Continued)

(30) Foreign Application Priority Data

Aug. 7, 2007 (JP) .................. 2007-204976
Oct. 29, 2007 (JP) .................. 2007-281026

(51) Int. Cl.
*G02B 21/06* (2006.01)
*G02B 21/00* (2006.01)
(Continued)

(52) U.S. Cl.
CPC ......... *G02B 21/0088* (2013.01); *G02B 21/24* (2013.01); *G02B 21/361* (2013.01)

(58) Field of Classification Search
CPC .... G02B 21/00; G02B 21/0032; G02B 21/06; G02B 21/361; G02B 21/0004;
(Continued)

(56) References Cited

U.S. PATENT DOCUMENTS 3,458,244 A * 7/1969 Klein .................. G02B 21/025
359/380
3,551,019 A 12/1970 Michel
(Continued)

FOREIGN PATENT DOCUMENTS

JP Y1 51-034303 8/1976
JP H01-177724 U 12/1989
(Continued)

OTHER PUBLICATIONS

Jul. 28, 2016 Office Action issued in European Patent Application No. 08826893.3.
(Continued)

*Primary Examiner* — Thong Q Nguyen
(74) *Attorney, Agent, or Firm* — Oliff PLC

(57) ABSTRACT

The present invention relates to a microscope of which visibility, controllability and operability can be improved. In the microscope, an optical path and optical path of an image forming system are set so as to be perpendicular to each other when viewed from the top. In other words, in this microscope, there exists an ocular optical system that guides light, which propagates the optical path to optical path of the image forming system, to a user. The optical path is formed in a direction perpendicular to a direction of the light from a sample emitted from the ocular optical system to the user. The present invention can be applied to an inverted microscope.

10 Claims, 13 Drawing Sheets

Related U.S. Application Data continuation of application No. 12/671,624, filed as application No. PCT/JP2008/064143 on Aug. 6, 2008, now abandoned.

(51) Int. Cl.
*G02B 21/24* (2006.01)
*G02B 21/36* (2006.01)

(58) Field of Classification Search
CPC ............ G02B 21/0008; G02B 21/0012; G02B 21/0016; G02B 21/0028; G02B 21/0088; G02B 21/0092; G02B 21/02; G02B 21/18; G02B 21/36
USPC .................................................. 359/385–390
See application file for complete search history.

(56) References Cited

U.S. PATENT DOCUMENTS

| | | | |
|---|---|---|---|
| 3,798,435 | A | 3/1974 | Schindl |
| 4,210,384 | A | 7/1980 | Meyer et al. |
| 4,284,327 | A | 8/1981 | Kraft et al. |
| 4,403,839 | A | 9/1983 | Reichel |
| 4,605,287 | A | 8/1986 | Lang et al. |
| 4,619,503 | A | 10/1986 | Reinheimer et al. |
| 4,744,642 | A | 5/1988 | Yoshinaga et al. |
| 4,779,968 | A | 10/1988 | Sander |
| 5,015,081 | A | 5/1991 | Kitajima et al. |
| 5,552,928 | A | 9/1996 | Furuhashi et al. |
| 5,585,964 | A | 12/1996 | Schalz |
| 5,847,866 | A | 12/1998 | Otaki |
| 5,896,224 | A | 4/1999 | Kapitza |
| 6,160,662 | A | 12/2000 | Uchida et al. |
| 6,563,632 | B1 | 5/2003 | Schoeppe et al. |
| 7,446,936 | B2 | 11/2008 | Bender |
| 8,077,386 | B2 | 12/2011 | Glaser et al. |
| 10,613,309 | B2 * | 4/2020 | Murayama ............ G02B 21/24 |
| 2001/0003490 | A1 * | 6/2001 | Kawasaki ............ G02B 21/22 |
| | | | 359/385 |
| 2002/0131165 | A1 | 9/2002 | Takahama |
| 2003/0048530 | A1 | 3/2003 | Sander |
| 2005/0052733 | A1 | 3/2005 | Tamura et al. |
| 2005/0231798 | A1 | 10/2005 | Honda et al. |
| 2007/0146872 | A1 | 6/2007 | Bocher et al. |
| 2008/0231798 | A1 | 9/2008 | Zhou et al. |
| 2018/0364958 | A1 | 12/2018 | Ohara |

FOREIGN PATENT DOCUMENTS

| | | |
|---|---|---|
| JP | H5-127088 A | 5/1993 |
| JP | 2001-33706 A | 2/2001 |
| JP | 2003-75726 A | 3/2003 |
| JP | 2003-149559 A | 5/2003 |
| JP | 2004-245860 A | 9/2004 |
| JP | 2005-234279 A | 9/2005 |

OTHER PUBLICATIONS

Mar. 2, 2017 Office Action issued in U.S. Appl. No. 13/604,524.
Feb. 7, 2010 Written Opinion of the International Searching Authority issued in International Patent Application No. PCT/JP2008/064143.
Mar. 14, 2018 Office Action issued in U.S. Appl. No. 13/604,524.
Aug. 31, 2018 Office Action issued in U.S. Appl. No. 13/604,524.
Nov. 20, 2018 Office Action issued in U.S. Appl. No. 13/604,524.
Apr. 8, 2019 U.S. Office Action issued U.S. Appl. No. 13/604,524.
Aug. 15, 2019 Office Action Issued in U.S. Appl. No. 13/604,524.
Aug. 15, 2019 Office Action Issued in U.S. Appl. No. 15/839,293.
International Search Report issued for International Application No. PCT/JP2008/064143 dated Nov. 4, 2008.
Sep. 19, 2012 European Search Report issued in Application No. 08826893.3.
Mar. 27, 2012 English Translation of JP 2007-281026 Notice of Reasons for Rejection.
Jun. 12, 2012 English Translation of JP 2007-281026 Decision of Final Rejection.
Sep. 4, 2012 English Translation of JP 2008-202614 Notice of Reasons for Rejection.

* cited by examiner

MICROSCOPE

This is a Divisional Application of application Ser. No. 13/604,524 filed Sep. 5, 2012, which in turn is a Continuation of application Ser. No. 12/671,624 filed Feb. 1, 2010, which in turn is a National Stage of Application No. PCT/JP2008-064143, filed Aug. 6, 2008. The disclosure of prior applications is hereby incorporated by reference herein in its entirety.

TECHNICAL FIELD

The present invention relates to a microscope, and more particularly to a microscope of which visibility, controllability and operability are improved.

BACKGROUND ART

Conventionally in an image forming optical system of an inverted microscope, there are an optical axis of an objective lens (hereafter referred to as an "objective optical axis"), and an optical axis constituting a part of an image forming optical path at a lens barrel side (hereafter referred to as a "lens barrel optical axis"). These objective optical axis and lens barrel optical axis are positioned at the center of the microscope unit (hereafter referred to as the "main body portion"), and are often disposed in parallel at the front and back when the side of an ocular is at the front (e.g. see Patent Document 1).

There is a type of inverted microscope which has a light source for illumination, so that the illumination light is guided from the light source to the illumination optical system, and illuminates a sample through an objective lens. Light from the sample is condensed by the object lens and is guided to the ocular via the image forming optical system. The user can observe the image of the sample through the ocular (e.g. see Patent Document 2).

An aperture is disposed in the middle of the illumination optical system, and the user adjusts the illumination state by controlling the aperture so that the sample is appropriately illuminated.

[Patent Document 1] Japanese Patent Application Laid-Open No. 2003-75726
[Patent Document 2] Japanese Patent Application Laid-Open No. 2005-234279

However according to the above mentioned conventional configuration of the inverted microscope, the objective optical axis is inevitably disposed in the back of the main body portion. The stop, which is in the middle of the illumination optical system, is also disposed behind the lens barrel support.

In such a conventional inverted microscope, visibility, controllability and operability for the user are not very good. For example, it is difficult to see what kind of objective lens is currently installed. In other words, visibility of the objective lens is poor.

Control of a revolver when magnification is changed, that is switching control of the objective lens, for example, is also difficult. Operability to replace samples or to change position of a sample is also not very good. In this way, if the optical path of the illumination optical system is positioned in the depth direction from the top view, the position of an element to control the stop is distant from the user, which makes operability poor when the user controls the stop while observing a sample through the ocular.

SUMMARY OF THE INVENTION

With the foregoing in view, it is an object of the present invention to improve visibility, controllability and operability of an inverted microscope.

A microscope of the present invention is a microscope having: an image forming optical system that condenses light from a sample, and guides it to an ocular optical system, and the ocular optical system that guides the light propagated on the optical path of the image forming optical system to a user, characterized in that the image forming optical system has an objective lens for condensing light from the sample, and a deflecting element for deflecting the light condensed by the objective lens, and the image forming optical system includes an optical axis of the objective lens, and includes at least a first optical path that is formed in parallel with the optical axis of the objective lens, and a second optical path that is formed by deflecting light, which propagates the first optical path, by the deflecting element, and is formed in a direction different from the first optical path, and the second optical path is formed roughly perpendicular to an emission direction of the light of the ocular optical system from the sample when viewed from the top.

A microscope of the present invention is a microscope having an illumination optical system that guides luminous flux from a light source for illumination and illuminates a sample, and an image forming optical system that guides light from the sample to an ocular so that an image of the sample can be observed via an objective lens, characterized in that the illumination optical system has, at least on a part of thereof, an optical path that guides the luminous flux from the light source in a lateral direction when a longitudinal direction is a direction parallel with the optical path of the ocular optical system when the microscope is viewed from the top, and a stop element for limiting the luminous flux emitted from the light source is disposed on the optical path in the lateral direction.

According to an aspect of the present invention, the illumination optical system has an optical path that guides the luminous flux from the light source in a lateral direction at least on a part of [the illumination optical system] when a longitudinal direction is a direction parallel with the optical path of the ocular optical system when the microscope is viewed from the top, and a stop for the illumination optical system is disposed on the optical path in the lateral direction.

As described above, according to the present invention, visibility, controllability and operability of the user improve compared with prior art. For example, visibility of the objective lens, controllability of switching the objective lens, and operability of replacing and changing position of a sample improve.

Figure 1:
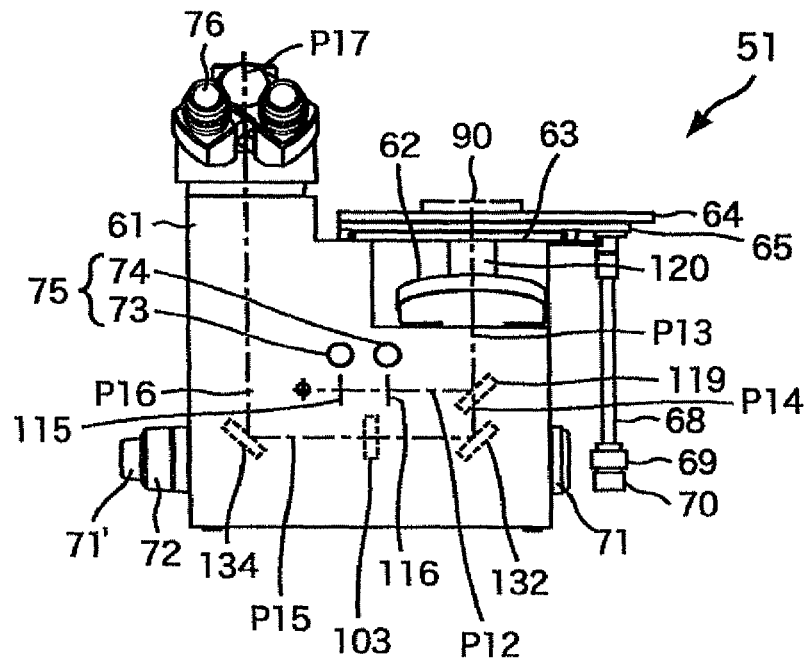
FIG. 1 is a front view depicting a configuration of an embodiment of a microscope according to the present invention.

EXPLANATION OF REFERENCE NUMERALS 51 microscope
61 main body
64, 65 stage
71, 72 focusing handle
73, 74 adjustment element
76 ocular
81 housing portion
90 sample
120 objective lens
111 light source
112 collector lens
113 relay optical system
114 mirror
115 aperture stop
116 field stop
117 stop element
118 field lens group
119 half mirror

BEST MODE FOR CARRYING OUT THE INVENTION

Embodiments of the present invention will now be described with reference to the drawings.

Figure 2:
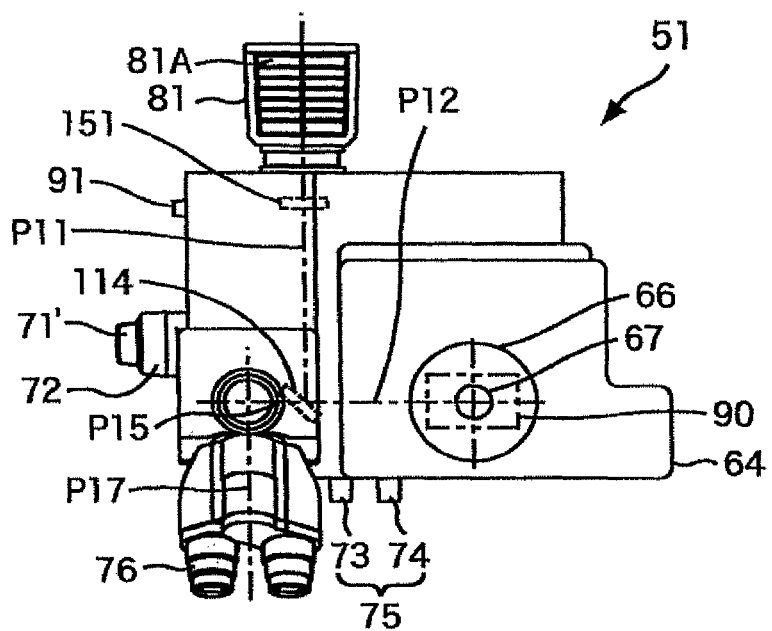
FIG. 2 is a top view depicting the configuration of the embodiment of the microscope according to the present invention.
Figure 3:
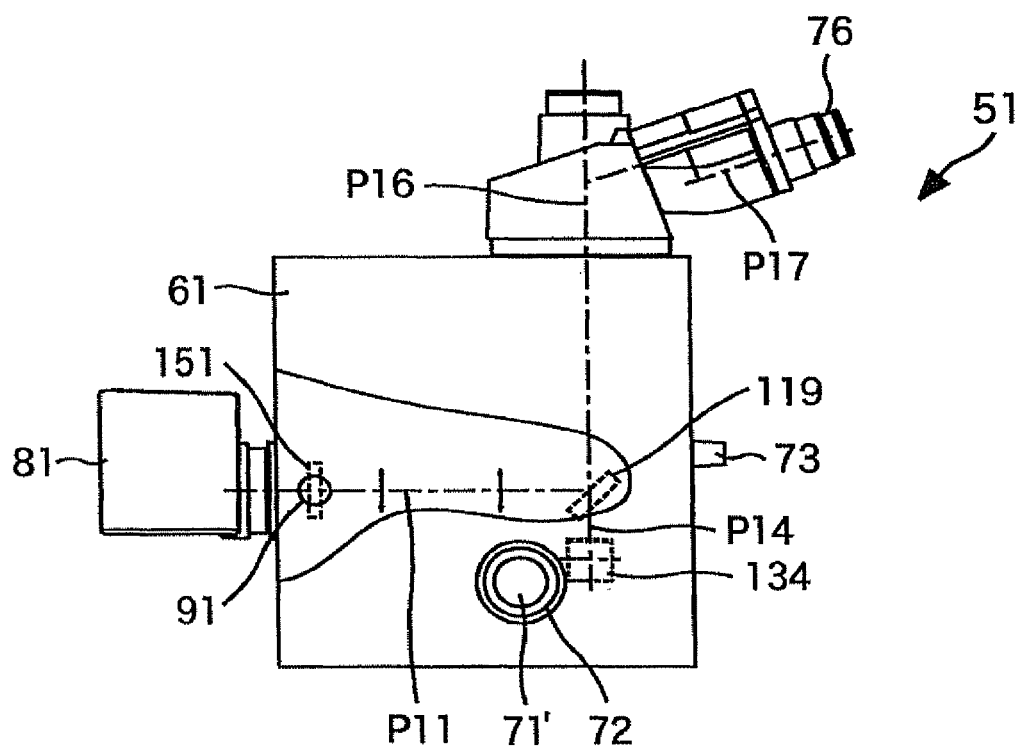
FIG. 3 is a side view depicting the configuration of the embodiment of the microscope according to the present invention.

FIG. 1 to FIG. 3 show a configuration of an embodiment of a microscope to which the present invention is applied. A revolver 62 is rotatably disposed at the upper right of the main body 61 of the microscope 51. Some objective lenses can be removably attached to this revolver 62, and the user can select an objective lens to be used by rotating the revolver 62 when necessary, and positioning a desired objective lens, out of the attached objective lenses, at a predetermined position. FIG. 1 shows a state where only one objective lens 120 is attached.

A stationary plate 63 is horizontally disposed on the main body 61 above the revolver 62. Stages 64 and 65 are disposed along the X axis (horizontal direction in FIG. 2) and the Y axis (vertical direction in FIG. 2) respectively, with respect to the stationary plate 63, so as to be freely moved. At the bottom of an adjustment axis 68 which is disposed at the right of the revolver 62 extending downward, an adjustment element 69 and an adjustment element 70 are rotatably attached. If the user turns the adjustment element 69 or the adjustment element 70 clockwise or counterclockwise, the stage 64 or the stage 65 moves in the X axis direction or the Y axis direction respectively.

A sample holder 66 is removably disposed on the stage 64. The user selects a predetermined one of the plurality of sample holders 66, according to a sample 90 to be observed, attaches the selected one onto the stage 64, and places the sample 90 thereon. A hole 67 is formed at the center of the sample holder 66, and luminous flux from the objective lens 120 is irradiated onto the sample 90 through this hole 67. Therefore the user can observe a predetermined position on a horizontal plane (xy plane) of the sample 90 disposed on the stage 64 by adjusting the adjustment element 69 and the adjustment element 70 by rotating.

A focusing handle 71 is rotatably installed on the right side face of the main body 61, and a focusing handle 71' and a focusing handle 72 are rotatably installed on the left side face thereof respectively. The user finely moves the revolver 62, on which the objective lens 120 is attached, closer to or away from the sample 90 by turning the focusing handle 71 or the focusing handle 71' so that the focusing state by the objective lens 120 can be finely adjusted, and the user also coarsely moves the revolver 62 closer to or away from the sample 90 by turning the focusing handle 72, therefore focusing can be finely or coarsely adjusted.

An adjustment element 75, including an adjustment element 73 for adjusting the aperture stop and an adjustment element 74 for adjusting the field stop, is rotatably installed at the lower right of the ocular 76 on the front face of the main body 61. The user can adjust the opening of the later mentioned stop element 117 (aperture stop 115 or field stop 116) by turning the adjustment element 75 (adjustment element 73 for adjusting the aperture stop or adjustment element 74 for adjusting the field stop). A reticle attaching area for inserting/removing a reticle 103, on which a scale is written so that the scale is visible overlapping with the image of the sample 90, is also disposed on the front face of the main body 61.

The ocular 76 is disposed at the upper left of the main body 61. The ocular 76 is located higher than the stage 64. The user can observe the image of the sample 90 through the ocular 76. And the user can also observe the sample 90 directly if away from the ocular 76. This ocular 76 may be an ocular optical system constituted by one [lens] or a plurality of lenses.

Figure 8:
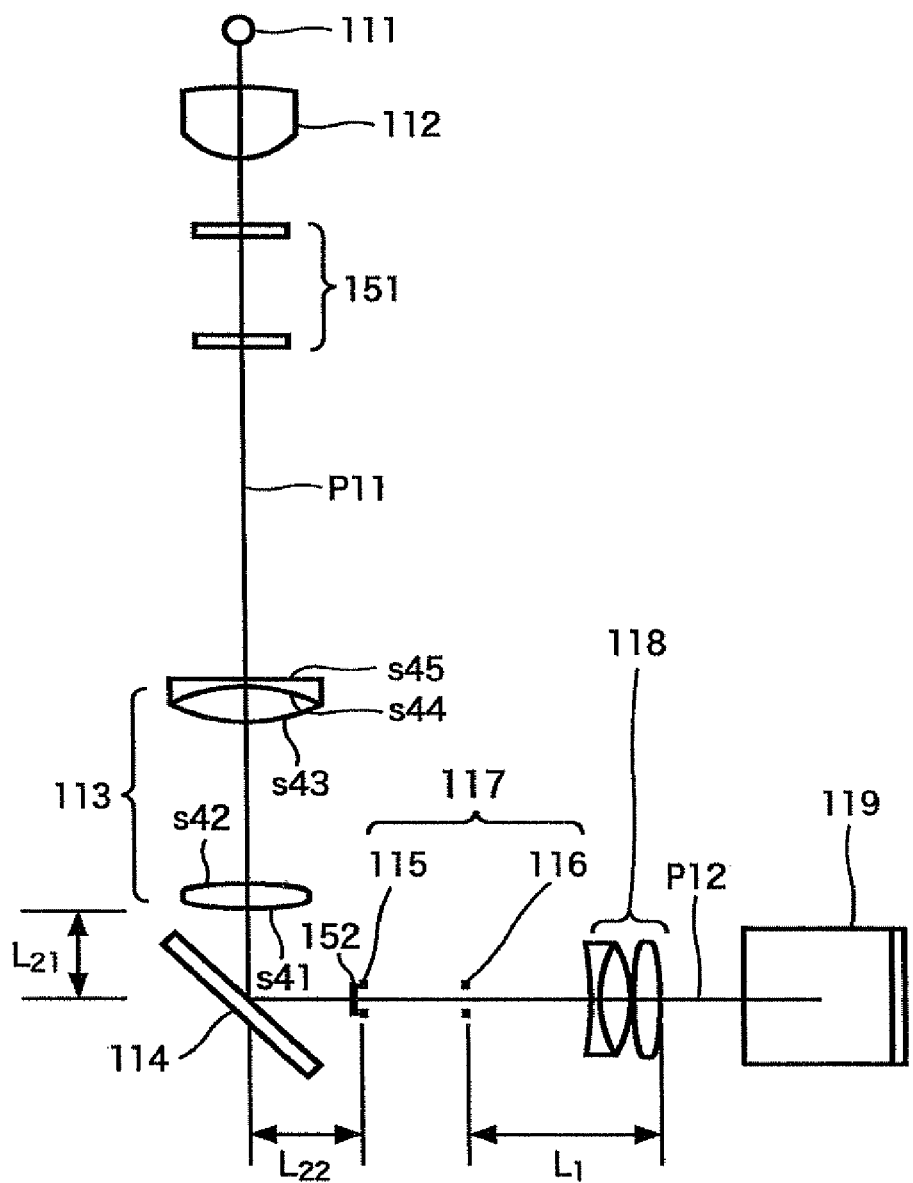
FIG. 8 is a top view depicting a configuration of an illumination optical system according to an embodiment of the microscope of the present invention.

The back of the left side face of the main body 61 is provided with a control unit 91, which is used when an optical element, such as a filter 151 and a deflecting element, which are described later with reference to FIG. 8, is disposed on an optical path or is replaced.

Figure 4:
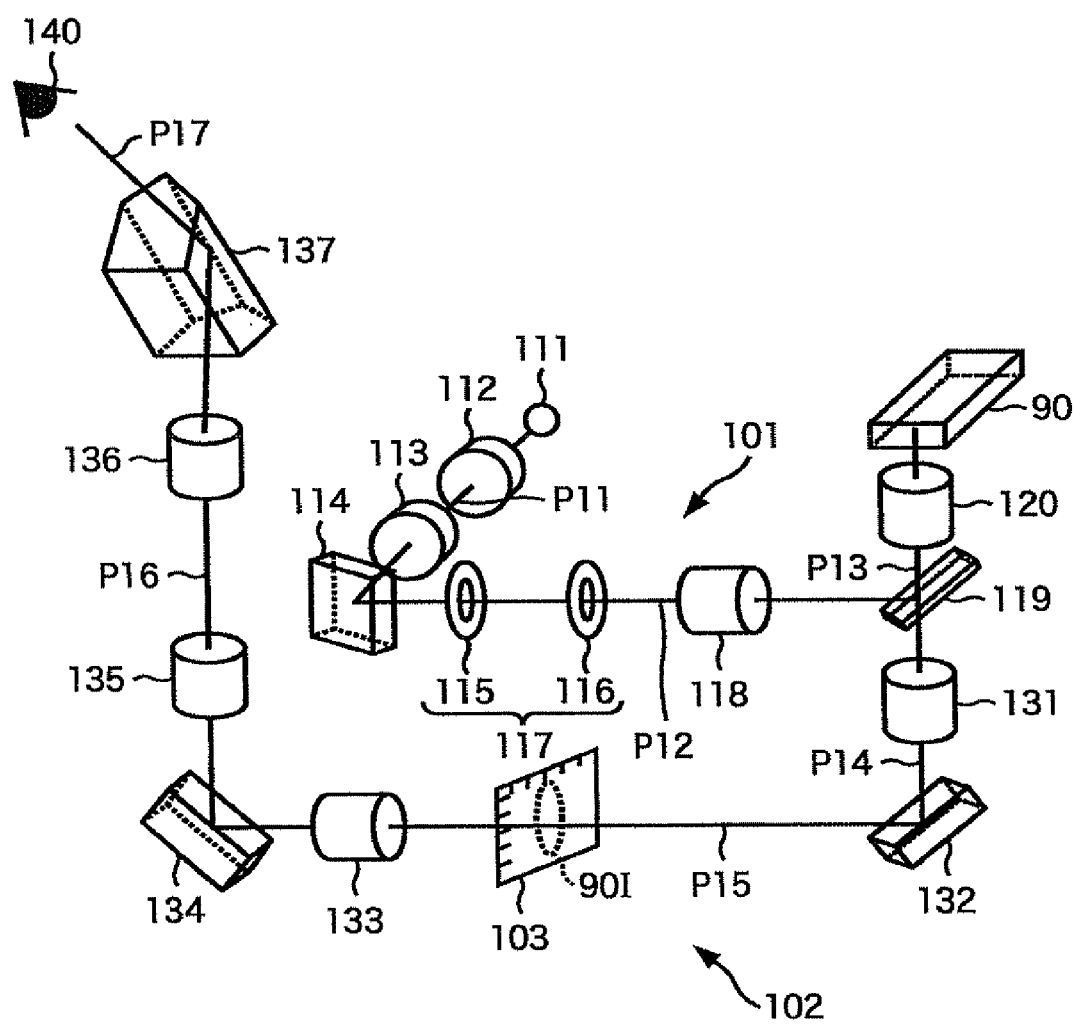
FIG. 4 is a perspective view depicting a configuration of an illumination optical system and an image forming optical system according to the embodiment of the microscope of the present invention.

A housing unit 81 is disposed at the left rear of the back face of the main body 61. In the housing unit 81, a light source 111 for illumination, which is described with reference to FIG. 4, is housed. A cooling fin 81A is disposed on the side face of the housing unit 81 for releasing heat generated in the light source 111. The housing unit 81 is disposed in a location away from the sample holder 66 position on the stage 64 and the ocular 76, so that the heat generated from the light source 111 does not affect the sample 90, or does not cause discomfort to the user looking into the ocular 76.

FIG. 4 shows a configuration of an optical system inside the main body 61. This optical system has: an illumination optical system 101 that guides luminous flux from a light source 111 for illumination, and illuminates a sample through the objective lens 120, and an image forming optical system 102, which guides a reflected light from the sample to the ocular 76 so that the image of the sample 90 can be observed through the objective lens 120.

In the illumination optical system 101, the light source 111 constituted by a halogen lamp or the like emits luminous flux for illumination. The luminous flux for illumination travels in the sequence of a collector lens 112, relay optical system 113 and mirror 114, which are arranged in the direction of the optical path P11. The collector lens 112 converts divergent rays from the light source 111 into approximately parallel rays. The relay optical system 113 forms a light source image, which is an image of the light source 111, at a position of an aperture stop 115. The mirror 114 is disposed between the light source image and the relay optical system 113, and deflects the luminous flux, which travels on an optical path P11, which is directed from the light source 111 to the user (direction of the ocular 76 when viewed from the top) horizontally, to the right direction, so as to be luminous flux on an optical path P12. In other words, in the case of FIG. 2 which is a top view of the microscope, the optical path is deflected to the optical path P12 in the lateral direction when the longitudinal direction is a direction parallel with the optical path P11 closest to the light source 111, which directs downward parallel with the page face.

The aperture stop 115, field stop 116, field lens group 118 and half mirror 119 are sequentially disposed on the optical path P12. The aperture stop 115 is disposed on a position of the optical path P12, where an image of the light source 111 is formed by the collector lens 112 and the relay optical system 113. If the position of the light source 111 is near the front side focal plane of the collector lens 112, the field stop 116 is roughly in a conjugate relationship with the rear side focal plane of the collector lens 112 on the optical path P12, and is disposed near a position where an image of the rear side focal plane of the collector lens 112 is formed by the relay optical system 113. The field lens group 118 is disposed such that the front side focal plane thereof overlaps with the field stop 116, in order to project the image of the field stop 116 on the observation surface of the sample 90.

The half mirror 119, as a luminous flux combining element, deflects the optical path P12 of the luminous flux for illumination from the field lens group 118 to the vertical direction (up direction in FIG. 1), that is an optical path P13 which is directed to the objective lens 120. This optical path P13 is an optical path having a center which matches the optical axis of the objective lens 120, and by the half mirror 119, the optical axis of the optical path for illumination P13, is matched with the optical axis of an optical path for observation P14, by the objective lens 120. The luminous flux deflected to the optical path P13 forms an image of the light source 111 at a pupil position of the objective lens 120, and becomes approximately parallel rays by the objective lens 120, and illuminates a sample 90, constituted by metal, for example.

In the image forming optical system 102, lights reflected or scattered by the sample 90 are condensed by the objective lens 120 so as to be luminous flux for observation, and the luminous flux from each point of the sample 90 becomes parallel luminous flux by the objective lens 120, and becomes the luminous flux of the optical path P14 close to the objective lens 120 which faces the direction vertically below the plane where the sample 90 is placed. This luminous flux is separated from the luminous flux for illumination by passing through the half mirror 119. In other words, the half mirror 119 and the objective lens 120 have dual functions of the illumination optical system 101 and the image forming optical system 102, and the optical path P13 becomes a common optical path of the illumination optical system 101 and the image forming optical system 102. A second objective lens 131, disposed on an optical path P14, converges the luminous flux transmitted through the half mirror 119, and forms an image 901 of the sample 90. At this position, a reticle 103, on which a scale or the like is written, so as to be viewed overlapping with the image of the sample 90, is replaceably attached.

A mirror 132 deflects an approximately vertical optical path P14 to be approximately horizontal, that is the left direction in FIG. 1 and FIG. 4, in order to be an optical path P15. This means that the optical path P15 is approximately parallel with the optical path P12, and these paths are positioned on a same line from the top view, as shown in FIG. 2.

A primary image, which is an intermediate image of the sample formed by the second objective lens 131, is formed on the optical path P15, and the luminous flux which formed the intermediate image enters a mirror 134 via a relay lens 133, and is deflected approximately vertically in the upward direction by the mirror 134, and travels on an optical path P16. The relay lens 133 and relay lens 135 relay the image forming light so as to guide the primary image to the optical axis of the ocular 76. The luminous flux from the mirror 134 is relayed by the relay lens 133 disposed on the optical path P15 and the relay lens 135 disposed on the optical path P16 constituting the relay optical system, and enters an image forming lens 136 on the optical path P16. The luminous flux emitted from the image forming lens 136 is reflected by a prism 137, is split into two optical paths by an optical path dividing element, which is not illustrated, and enters the ocular 76 along an optical path P17. Therefore the user can observe an expanded image of the sample 90 via the ocular 76 with their eyes 140.

As FIG. 4 shows, the deflecting optical element constituted by a mirror may be constituted by a prism, not a mirror. The prism 137 may be constituted by a porro prism, roof prism or the like, or a mirror may be used for deflecting instead.

Figure 5:
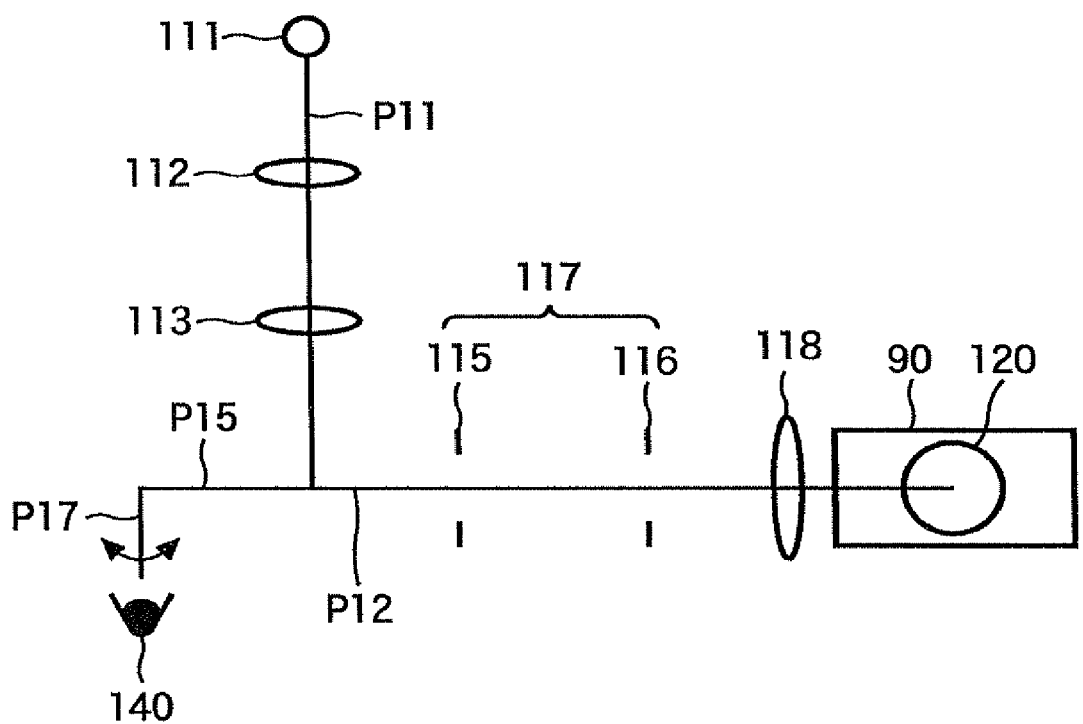
FIG. 5 is a top view depicting a positional relationship of each optical path of the illumination optical system and the image forming optical system according to the embodiment of the microscope of the present invention.

FIG. 5 shows a relationship of the optical paths of the illumination optical system 101 and the image forming optical system 102 when viewed from the top. The optical path P11 for illumination and the optical path P17 of the ocular 76 are optical paths approximately parallel with the depth direction (vertical direction in FIG. 2, horizontal direction in FIG. 3) of the microscope 51, and are optical paths directing from the light source 111 to the ocular 76 (the eyes of the user 140). Therefore in this configuration, the light source 111 can be disposed sufficiently distant from the user. The optical path P12 and the optical path P15 are optical paths approximately vertical to the optical path P11, that is, vertical to the optical path P17. Since the stage is disposed at the horizontal direction of the user, the user can easily reach the sample 90 disposed on the stage 64 while looking into the ocular 76.

If the ocular 76 can rotate the optical axis direction thereof with respect to the optical path P16, at least the optical path P17 may have an orthogonal relationship with the optical path P12 of the illumination optical system 101 or the optical path P15 of the image forming optical system 102 when the microscope 51 is viewed from the top, and this aspect corresponds to the present invention as well. In this microscope 51, the optical path P13, which is closest to the sample, of the illumination optical system 101 and the image forming optical system 102, is a common optical path [of the illumination optical system 101 and the image forming optical system 102], and can be used for vertical illumination. Therefore [the present microscope 51] is most appropriate for an inverted microscope in which a heavy sample can be easily placed on the stage, and the sample can be easily reached during microscopic observation.

Figure 6:
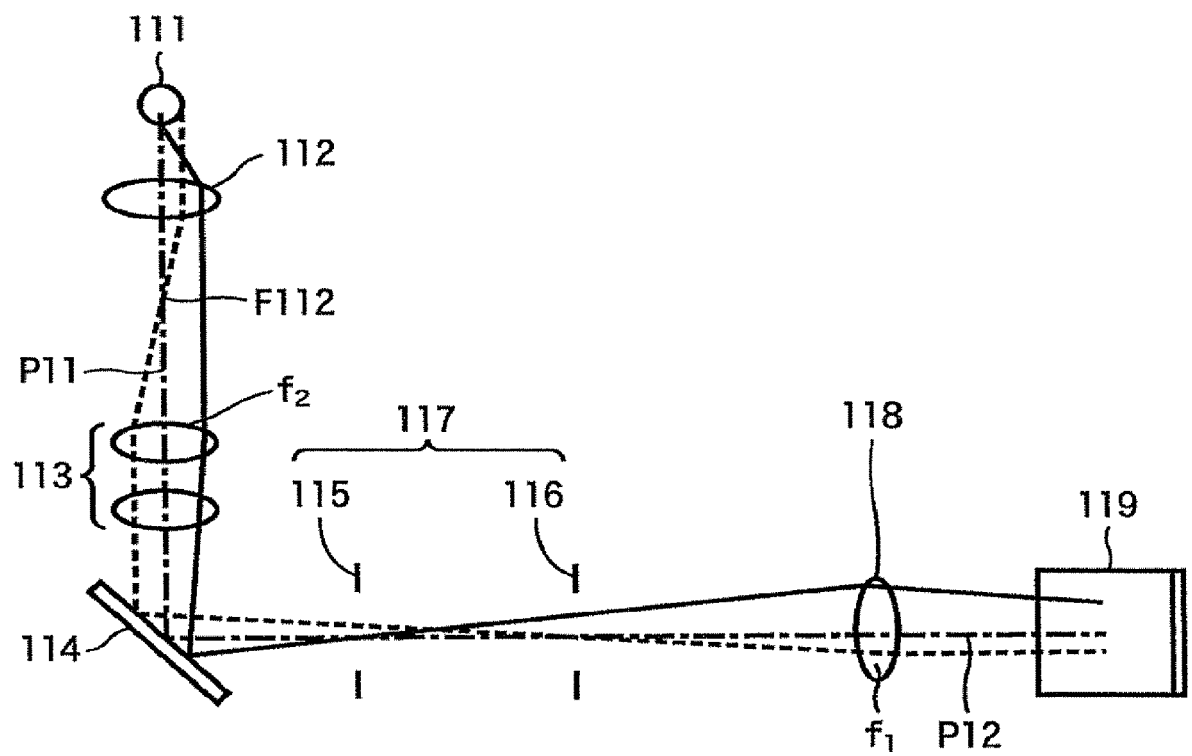
FIG. 6 is a top view depicting the configuration of the illumination optical system according to the embodiment of the microscope of the present invention.

FIG. 6 shows a detailed positional relationship of the optical elements disposed on the optical path of the illumination optical system 101. The light source 111 and the aperture stop 115 are in a conjugate [relationship], and the rear side focal plane of the objective lens 120 in FIG. 4 is also approximately in a conjugate relationship. The focal plane F112 of the collector lens 112, on which lights emitted from the light source 111 parallel with the optical axis are converged by the collector lens 112, and the field stop 116, are approximately in a conjugate relationship. The focal plane F112 and the luminous flux that passes through the field stop 116, which is transformed into parallel rays by the field lens group 118, also enters a conjugate relationship with the observation plane of the sample 90 by the objective lens 120.

In this way, according to the present embodiment, when the direction of the optical path P11, which is parallel with the optical path P17 of the ocular (vertical direction in FIG. 6), in other words, the direction the user faces when the user uses the microscope 51, is the longitudinal direction, the luminous flux from the light source 111 is deflected to the lateral direction, that is the left and right directions of the user, by the mirror 114 as a deflecting element. And the stop element 117, which is a stop element constituted by the aperture stop 115 and the field stop 116, is disposed on the optical path P12 in the lateral direction. The adjustment element 75, which adjusts the stop element 117 using a known structure, is disposed near the stop element 117. Therefore the adjustment element 75, for adjusting the stop element 117 (adjustment element 73 for adjusting the aperture stop and the adjustment element 74 for adjusting the field stop), can be disposed on the front face of the main body 61 (surface closest to the ocular 76 out of the four side faces of an approximately rectangular parallelopiped main body 61), so the user who works while keeping their eyes 140 close to the ocular 76 can easily manipulate the adjustment element.

Since the optical path P12 is disposed in the horizontal direction, the depth can be decreased, and the control unit 91 can be disposed in a position close to the ocular 76, compared with the case of disposing the optical path P12 vertically on a same line with the optical path P11, which is closest to the light source 111. Therefore the user can easily execute control of such an operation as replacing a filter.

In the illumination optical system, the collector lens 112, relay optical system 113 and field lens group 118, which are disposed immediately after the light source for illumination, are combined so as to create positions to dispose the aperture stop 115, field stop 116 and filter 151. Generally in order to efficiently guide light from a light source, having dimensions of a commercial product, to the objective lens 120 and illuminate a sample 90, 40 to 50 mm of an optical path length is required for the collector lens, 100 to 250 mm for the relay lens optical system, and 80 to 120 mm for the field lens group. As a result, about a 220 mm to 420 mm length is required for the optical paths. In order to secure such a long optical path length, dimensions in certain directions must be taken to be very long in prior art, but according to the present invention, dimensions in all directions can be compact, while improving controllability.

The angle between the optical path P17 closest to the ocular 76 (path P11 closest to the light source 111 that is parallel with the optical path P17) and the optical path P12, that is the angle in the lateral direction when the direction of the optical path P17 closest to the ocular 76 is the longitudinal direction, when viewed from the top, need not be exactly a right angle, but may be an obtuse or acute angle close to a right angle, only if the adjacent element 75 for adjusting the aperture stop 115 and the field stop 116 can be disposed on the front face of the main body 61 with that angle.

Figure 7:
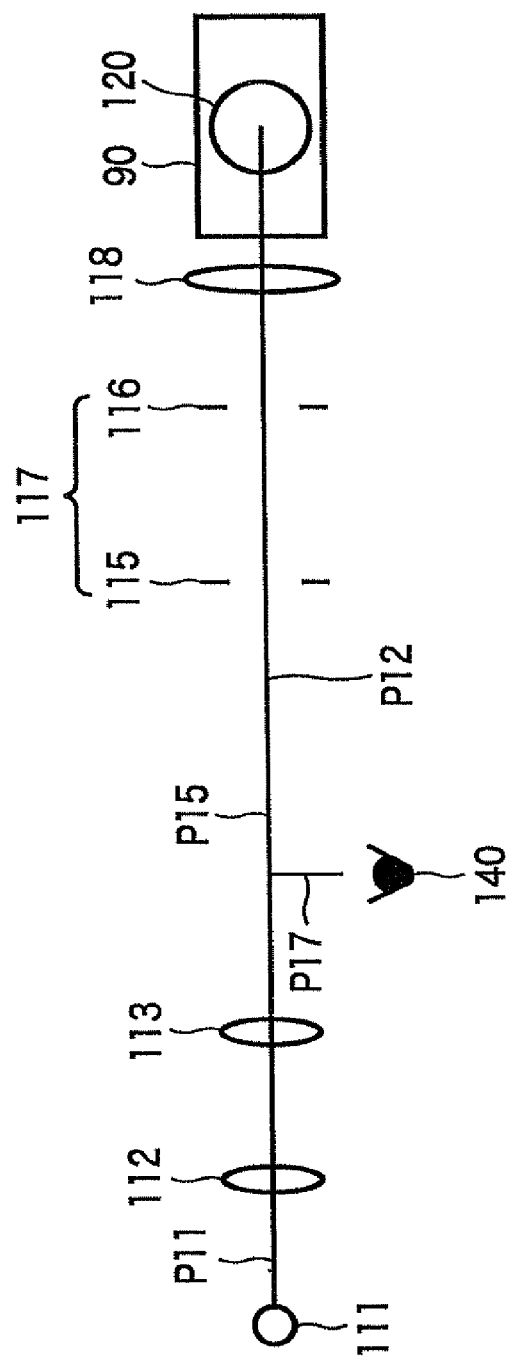
FIG. 7 is a top view depicting a positional relationship of the illumination optical system with respect to an optical path P17 according to the embodiment of the microscope of the present invention.

As FIG. 7 shows, in the illumination optical system 101, the mirror 114 may be omitted, and the optical path P11 constituted by the light source 111, collector lens 112 and relay optical system 113, may be parallel with the optical path P12, in other words, the optical path of the illumination optical system 101 may be linear so that the entire system is disposed in a lateral direction (left and right direction) with respect to the optical path P17 of the ocular 76 as the longitudinal direction. However if the optical path of the illumination optical system 101 is linear, the housing unit 81 of the light source 111 becomes close to the user. This increases the possibility for the user to touch the housing unit 81 of the light source 111 in error, and experience discomfort, so it is preferable to change the direction of the optical path so as to be the optical path P11 and the optical path P12, as shown in the present embodiment.

In order to dispose both the aperture stop 115 and the field stop 116 on the optical path P12, the field stop 116 must be close to the optical path P13 of the objective lens 120. For this, the present inventor set the focal distance f1 and the distance L1 between a surface of the field lens group 118 that is most distant from the field stop 116, of the field lens group 118, and the surface of the field stop 116 along the optical axis, so as to satisfy the relationship of the following expression (1):

$$1 < L1/f1 < 1.2 \tag{1}$$

If the value of L1/f1 is smaller than the lower limit value, that is 1 or less, a strong telephoto ratio is demanded for the field lens group 118, and therefore aberrations, especially curvature of field, cannot be corrected. In concrete terms, the curvature of field can be evaluated by a Petzval sum, but if this value exceeds ±0.015, the state of difference of the focus between the center and the edge can be visually recognized when a flat sample is observed. If the value L1/f1 is smaller than the lower limit value, it becomes difficult to maintain the value of the Petzval sum in a ±0.015 range. If parallel rays enter the field lens group 118 from a direction of the half mirror 119, which is opposite of the illumination light advancing direction, the rays are tracked, and the parallel rays form an image on the plane of the field stop 116. In this case, if the value of the Petzval sum is large, a curvature of field is generated, and when the image of the field stop 116 overlaps with the sample 90 during observation, the focusing plane shifts depending on the numerical aperture of the field stop 116, and controllability deteriorates.

If the value L1/f1 exceeds the upper limit value, that is 1.2 or more, the optical path length between the field stop 116 and the field lens group 118 becomes long, which is disadvantageous for downsizing. As a result, the arrangement of each component of the microscope is forced to be changed, and it becomes difficult to dispose both the aperture stop 115 and the field stop 116 on the optical path P12, and the control unit 91 becomes distant from the user, which worsens controllability. Hence it is preferable that the value L1/f1 satisfies the relationship of expression (1).

In order to dispose the optical path P12 in a lateral direction with respect to the optical path P11 disposed in the longitudinal direction (depth direction), the mirror 114, as a deflecting element, must be disposed between the relay optical system 113 and the aperture stop 115. For this, the present inventor discovered that the focal distance f2 of the relay optical system 113 and the distance L2 between a surface, that is closest to the aperture stop 115, of the relay optical system 113 and the surface of the aperture stop 115 along the optical axis, satisfy the relationship of the following expression (2):

$$0.70 < L2/f2 < 1.0 \quad (2)$$

Since the aperture stop 115 is disposed at the position of the rear side focal point of the relay optical system 113, the distance between the surface, that is closest to the aperture stop 115, of the relay optical system 113 and the focal point, in other words the back focus, must be sufficiently long, in order to dispose the mirror 114 between the relay optical system 113 and the aperture stop 115. If the value L2/f2 does not reach the lower limit value, that is 0.70 or less, the space to insert the mirror 114 becomes small. This means that an effective diameter of the mirror 114 must be smaller, and as a result, the NA of illumination decreases. If L2/f2 exceeds the upper limit value, that is 1.0 or more, on the other hand, the diameter of the luminous flux to satisfy the required illumination NA becomes too large, and aperture of the relay optical system 113 also increases. Therefore it is preferred that the value L2/f2 satisfies the relationship of expression (2).

FIG. 8 shows a configuration of the illumination optical system 101 when L1=54.7 mm and f1=50 mm, that is L1/f1=1.09 in expression (1), and L2=56.4 mm and f2=67.7 mm, that is L2/f2=0.83 in expression (2). The value of the Petzval sum in this case is 0.014. In FIG. 8, a filter 151 is disposed between the collector lens 112 and the relay optical system 113, and a diffusion plate 152, for diffusing light, is disposed immediately before the aperture stop 115. The distance L2 is a sum of the distance L21 between the surface, that is closest to the mirror 114, of the relay optical system 113 and the mirror 114 along the center of the optical path, and the distance L22 between the mirror 114 and the aperture stop 115 along the center of the optical path.

Figure 9:
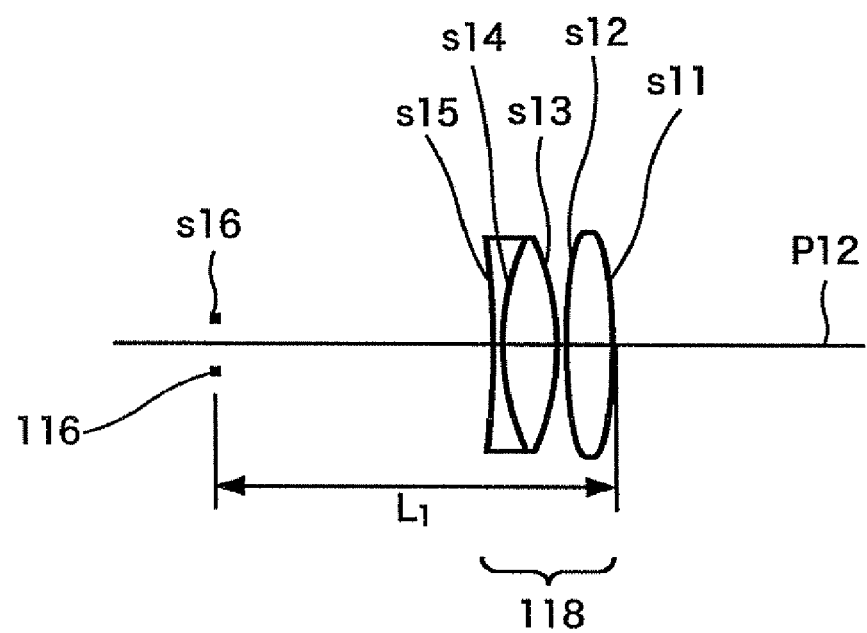
FIG. 9 is a top view depicting a configuration of a field lens group and field stop for tracking rays.

FIG. 9 is a diagram depicting the state of tracking rays when parallel rays are entered into the field lens group 118 shown in FIG. 8 from the half mirror 119, that is an opposite direction of the traveling direction of the illumination light. Out of the two lenses constituting the field lens group 118, a lens that is distant from the field stop 116, having a surface s16, has a surface s11 which is located further from the field stop 116 and a surface s12 which is located closer to the field stop 116. The lens close to the field stop 116 has a surface s13 which is located further from the field stop 116, an intermediate surface s14 and a surface s15 which is located closer to the field stop 116.

TABLE 1

| Surface | Radius of curvature | Surface distance | nd | vd |
|---------|---------------------|------------------|---------|-------|
| s11 | 60.000 | 6 | 1.49782 | 82.52 |
| s12 | −60.000 | 0.5 | | |
| s13 | 35.000 | 7.5 | 1.49782 | 82.52 |
| s14 | −40.000 | 1.5 | 1.65412 | 39.7 |
| s15 | 75.521 | 39.2 | | |
| s16 | 0.000 | | | |

Table 1 shows the result of tracking rays in the field lens group 118 in FIG. 9. The radius of curvature of the surface s11 to the surface s16 is: 60.000 mm, −60.000 mm, 35.000 mm, −40.000 mm, 75.521 mm and 0.000 mm respectively.

The distance between the surface s11 and the adjacent surface s12 is 6 mm, the distance between the surface s12 and the adjacent surface s13 is 0.5 mm, the distance between the surface s13 and the adjacent surface s14 is 7.5 mm, the distance between the surface s14 and the adjacent surface s15 is 1.5 mm, and the distance between the surface s15 and the adjacent surface s16 is 39.2 mm.

The refractive index nd at the d-line (emission line when light source is an Na lamp) is 1.49782 in the surface s11 and surface s13, and 1.65412 in the surface s14. The Abbe number vd is 82.52 in the surface s11 and surface s13, and is 39.7 in the surface s14.

Table 2 shows the lens data of the relay optical system 113 in FIG. 8. The surface numbers are assigned sequentially from the surface closest to the aperture stop 115 to the light source 111. Out of the two lenses constituting the relay optical system 113, the lens distant from the aperture stop 115 has a surface s45 which is located further from the aperture stop 115, an intermediate surface s44 and a surface s43 which is located closer to the aperture stop 115. The lens closer to the aperture stop 115 has a surface s42 which is located further from the aperture stop 115, and a surface s41 which is located closer to the aperture stop 115.

TABLE 2

| Surface | Radius of curvature | Surface distance | nd | vd |
|---------|---------------------|------------------|---------|-------|
| s41 | 78.750 | 7 | 1.5168 | 64.1 |
| s42 | −78.750 | 50 | | |
| s43 | 53.506 | 10 | 1.5168 | 64.1 |
| s44 | −35.930 | 2 | 1.72916 | 54.66 |
| s45 | 0.000 | | | |

Table 2 shows the result of tracking rays in the relay optical system 113 in FIG. 8. The radius of curvature and the surface distance are both in millimeter units. nd indicates a refractive index at the wavelength of the d-line, and vd indicates an Abbe number at the d-line as the central wavelength.

The distance L21 between the surface closest to the mirror 114 in the relay optical system 113 and the mirror 114 along the center of the optical path is 26.4 mm, and the distance L22 between the mirror 114 and the aperture stop 115 along the center of the optical path is 30.0 mm.

Figure 10:
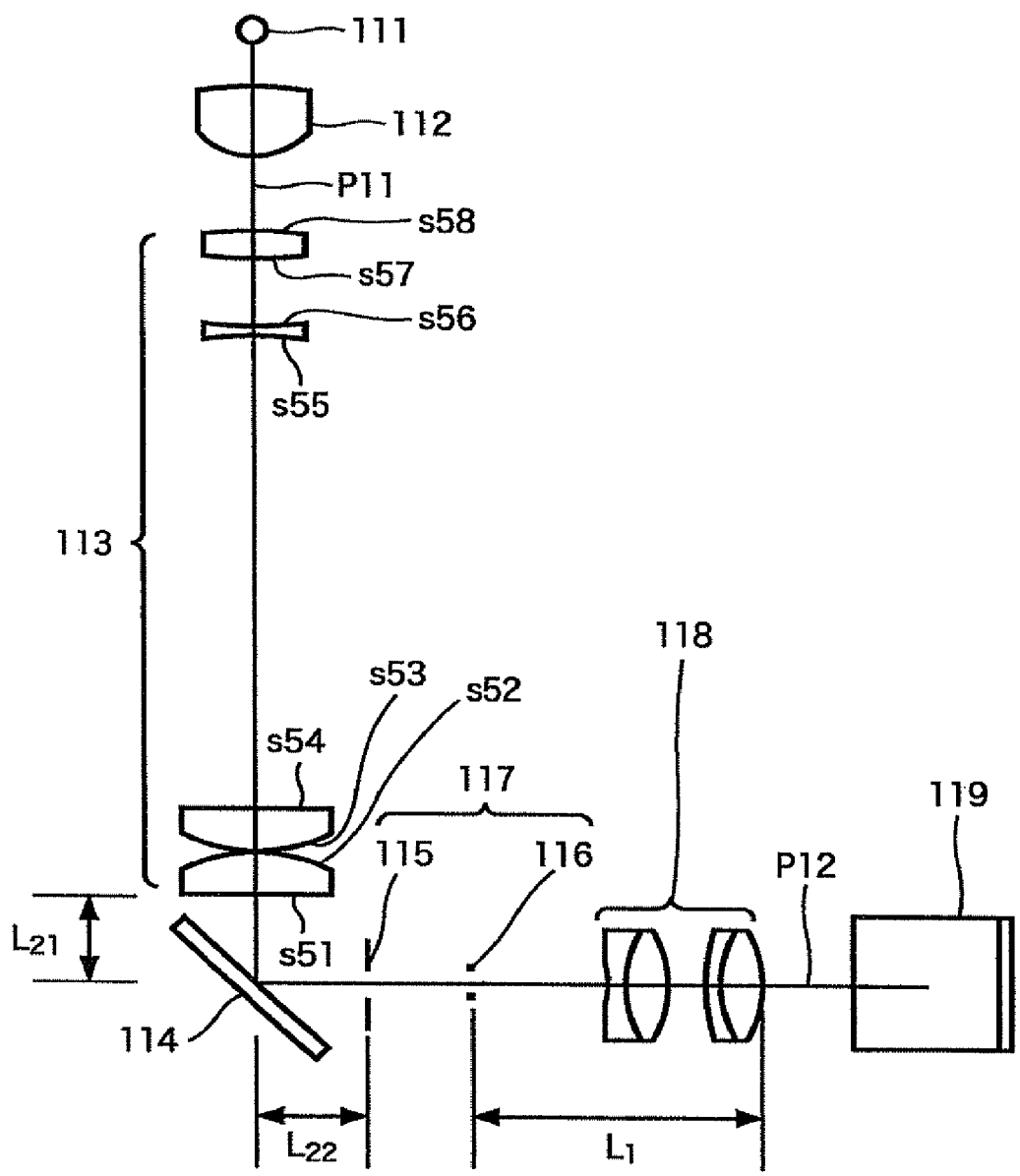
FIG. 10 is a top view depicting a configuration of an illumination optical system according to an embodiment of the microscope of the present invention.

FIG. 10 shows a configuration of the illumination optical system 101 when L1=57.9 mm and f1=50 mm, that is L1/f1=1.16, in expression (1), and L2=54.7 mm and f2=69.7 mm, that is L2/f2=0.78 in expression (2). The value of the Petzval sum in this case is 0.009.

Figure 11:
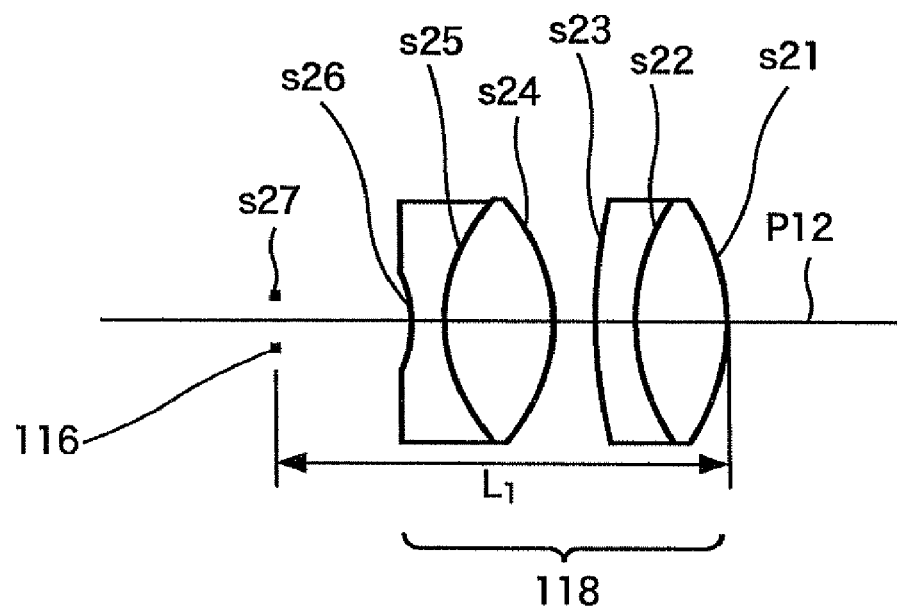
FIG. 11 is a top view depicting a configuration of a field lens group and a field stop for tracking rays.

FIG. 11 is a diagram depicting the state of tracking rays in the field lens group 118 in FIG. 10. Out of the two lenses constituting the field lens group 118, a lens that is distant from the field stop 116, having a surface s27, has a surface s21 which is located further from the field stop 116, an intermediate surface s22, and a surface s23 which is located closer to the field stop 116. The lens that is close to the field stop 116 has a surface s24 which is located further from the field stop 116, an intermediate surface s25, and a surface s26 which is located closer to the field stop 116.

TABLE 3

| Surface | Radius of curvature | Surface distance | nd | vd |
|---|---|---|---|---|
| s21 | 34.800 | 10 | 1.49782 | 82.52 |
| s22 | −32.300 | 5 | 1.65412 | 39.7 |
| s23 | −64.922 | 7.7 | | |
| s24 | 23.120 | 12 | 1.49782 | 82.52 |
| s25 | −33.500 | 5 | 1.7725 | 49.61 |
| s26 | 26.450 | 18.2 | | |
| s27 | 0.000 | | | |

Table 3 shows the result of tracking rays in the field lens group 118 in FIG. 11. The radius of curvature of the surface s21 to the surface s27 is: 34.800 mm, −32.300 mm, −64.922 mm, 23.120 mm, −33.500 mm, 26.450 mm and 0.000 mm respectively.

The distance between the surface s21 and the adjacent surface s22 is 10 mm, the distance between the surface s22 and the adjacent surface s23 is 5.0 mm, the distance between the surface s23 and the adjacent surface s24 is 7.7 mm, the distance between the surface s24 and the adjacent surface s25 is 12.0 mm, the distance between the surface s25 and the adjacent surface s26 is 5 mm, and the distance between the surface s26 and the adjacent surface s27 is 18.2 mm.

The reference index nd at the d-line is 1.49782 in the surface s21 and surface s24, 1.65412 in the surface s22 and 1.7725 in the surface s25. The Abbe number vd is 82.52 in the surface s21 and surface s24, and 39.7 in the surface s22 and 49.61 in the surface s25.

Table 4 shows the lens data of the relay optical system 113 in FIG. 10. The surface numbers are assigned sequentially from the surface closest to the aperture stop 115 to the light source 111. Out of the four lenses constituting the relay optical system 113, the lens most distant from the aperture stop 115 has a surface s58 which is located further from the aperture stop 115, and a surface s57 which is located closer to the aperture stop 115. The lens next distant from the aperture stop 115 has a surface s56 which is located further from the aperture stop 115, and a surface s55 which is located closer to the aperture stop 115. The lens second closest to the aperture stop 115 has a surface s54 which is located further from the aperture stop 115, and a surface s53 which is located closer to the aperture stop 115. The lens closest to the aperture stop 115 has a surface s52 which is located further from the aperture stop 115, and a surface s51 which is located closer to the aperture stop 115.

TABLE 4

| Surface | Radius of curvature | Surface distance | nd | Nd |
|---|---|---|---|---|
| s51 | 0.000 | 12.0 | 1.62041 | 60.29 |
| s52 | −58.181 | 0.2 | | |
| s53 | 95.419 | 12.0 | 1.62041 | 60.29 |
| s54 | 0.000 | 118.6 | | |
| s55 | −49.024 | 2.5 | 1.7725 | 49.61 |
| s56 | 80.000 | 17.7 | | |

TABLE 4-continued

| Surface | Radius of curvature | Surface distance | nd | Nd |
|---|---|---|---|---|
| s57 | 115.822 | 7.0 | 1.48749 | 70.41 |
| s58 | −44.878 | | | |

Table 4 shows the result of tracking rays in the relay optical system 113 in FIG. 10. The radius of curvature and the surface distance are both in millimeter units. nd indicates a refractive index at the wavelength of the d-line, and vd indicates an Abbe number at the d-line as the central wavelength.

The distance L21 between the surface closest to the mirror 114 in the relay optical system 113 and the mirror 114 along the center of the optical path is 25.0 mm, and the distance L22 between the mirror 114 and the aperture stop 115 along the center of the optical path is 29.7 mm.

Figure 12:
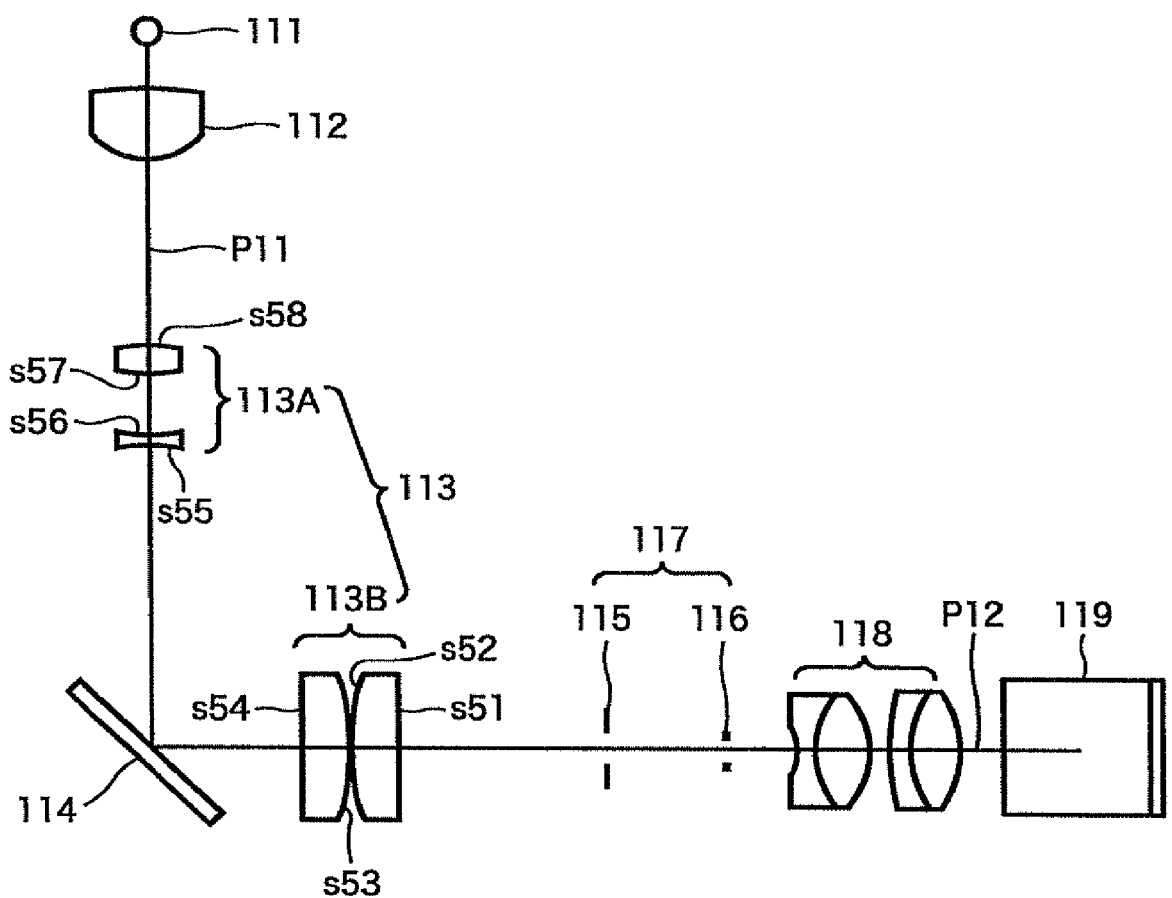
FIG. 12 is a top view depicting a configuration of an illumination optical system according to an embodiment of the microscope of the present invention.

The relay optical system 113 in FIG. 10 can be divided into a pre-stage optical system 113A and a post-stage optical system 113B, as shown in FIG. 12, and a mirror 114 is disposed between the pre-stage optical system 113A and the post-stage optical system 113B. According to the configuration shown in FIG. 10, however, the sample 90 and the ocular 76 can be closer, and the entire system can be more compact.

Figure 13:
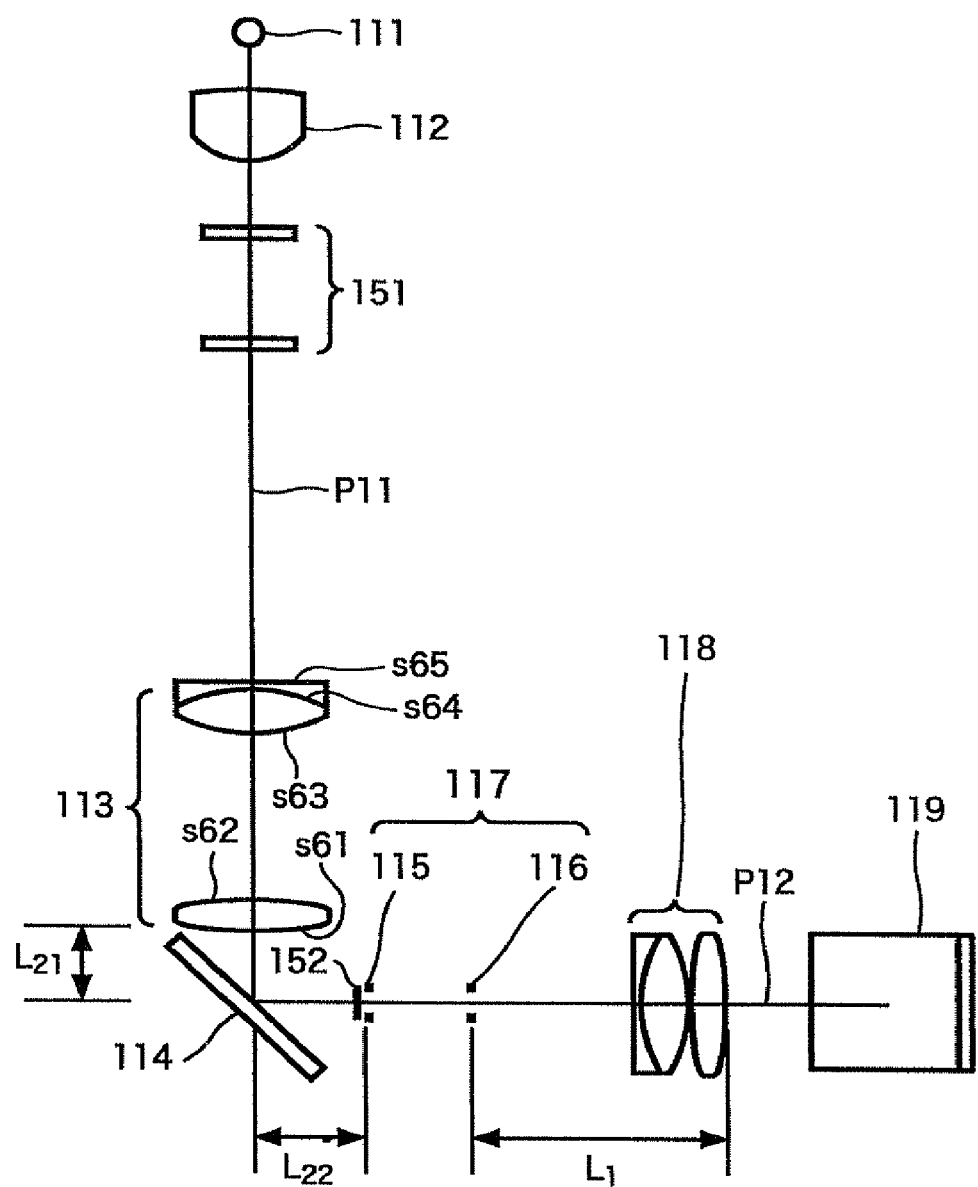
FIG. 13 is a top view depicting a configuration of an illumination optical system according to an embodiment of the microscope of the present invention.

FIG. 13 shows a configuration of the illumination optical system 101 when L1=65.8 mm and f1=60 mm, that is L1/f1=1.10 in expression (1), and L2=50.0 mm and f2=67.7 mm, that is L2/f2=0.74 in expression (2). The value of the Petzval sum in this case is 0.012. In FIG. 13, just like the case of FIG. 8, a filter 151 is disposed between the collector lens 112 and the relay optical system 113, and a diffusion plate 152, for diffusing light, is disposed immediately before the aperture stop 115.

Figure 14:
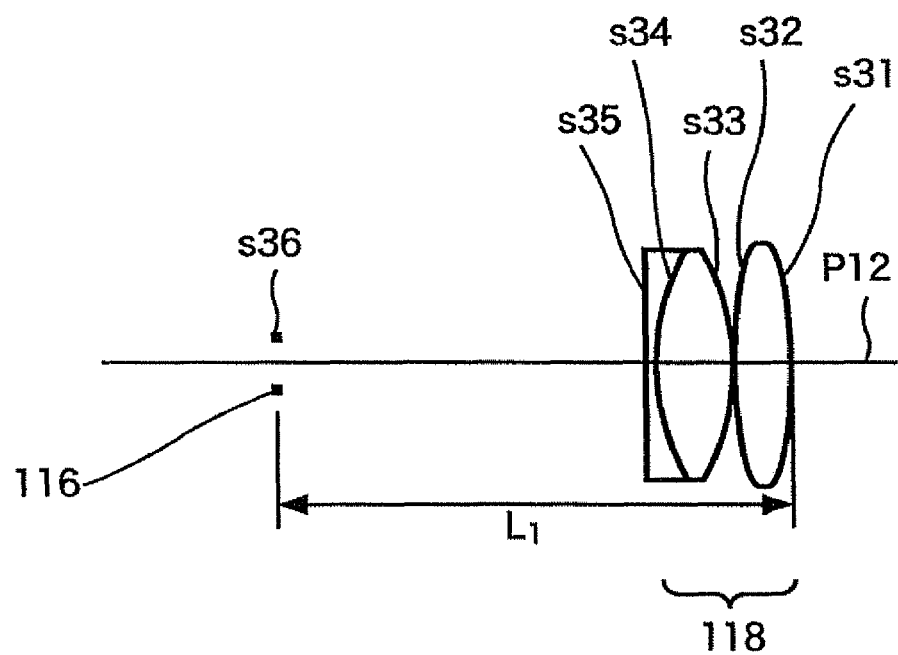
FIG. 14 is a top view depicting a configuration of a field lens group and a field stop for tracking rays.

FIG. 14 is a diagram depicting the state of tracking rays in the field lens group 118 in FIG. 13. Out of the two lenses constituting the field lens group 118, a lens that is distant from the field stop 116, having a surface s36, has a surface s31 which is located further from the field stop 116, and a surface s32 which is located closer to the field stop 116. The lens that is close to the field stop 116 has a surface s33 which is located further from the field stop 116, an intermediate surface s34, and a surface s35 which is located closer to the field stop 116.

TABLE 5

| Surface | Radius of curvature | Surface distance | nd | vd |
|---|---|---|---|---|
| s31 | 71.000 | 6 | 1.49782 | 82.52 |
| s32 | −71.000 | 0.5 | | |
| s33 | 59.000 | 7.5 | 1.49782 | 82.52 |
| s34 | −41.500 | 1.5 | 1.654115 | 39.7 |
| s35 | 263.308 | 50.3 | | |
| s36 | 0.000 | | | |

Table 5 shows the result of tracking rays in the field lens group 118 in FIG. 14. The radius of curvature of the surface s31 to the surface s36 is 71.000 mm, −71.000 mm, 59.000 mm, −41.500 mm, 263.308 mm and 0.000 mm respectively.

The distance between the surface s31 and the adjacent surface s32 is 6 mm, the distance between the surface s32 and the adjacent surface s33 is 0.5 mm, the distance between the surface s33 and the adjacent surface s34 is 7.5 mm, the distance between the surface s34 and the adjacent surface s35 is 1.5 mm, and the distance between the surface s35 and the adjacent surface s36 is 50.3 mm.

The refractive index nd at the d-line is 1.49782 in the surface s31 and surface s33, and 1.654115 in the surface s34. The Abbe number vd is 82.52 in the surface s31 and surface s33, and 39.7 in the surface s34.

Table 6 shows the lens data of the relay optical system 113 in FIG. 13. The surface numbers are assigned sequentially from the surface closest to the aperture stop 115 to the light source 111. Out of the two lenses constituting the relay optical system 113, the lens that is distant from the aperture stop 115 has a surface s65 which is located further from the aperture stop 115, and an intermediate surface s64, and a surface s63 which is located closer to the aperture stop 115. The lens that is close to the aperture stop 115 has a surface s62 which is located further from the aperture stop 115, and a surface s61 which is located closer to the aperture stop 115.

TABLE 6

| Surface | Radius of curvature | Surface distance | nd | vd |
| --- | --- | --- | --- | --- |
| s61 | 78.750 | 7 | 1.5168 | 64.1 |
| s62 | −78.750 | 50 | | |
| s63 | 53.506 | 10 | 1.5168 | 64.1 |
| s64 | −35.930 | 2 | 1.72916 | 54.66 |
| s65 | 0.000 | | | |

Table 6 shows the result of tracking rays in the relay optical system 113 in FIG. 13. The radius of curvature and the surface distance are both in millimeter units. nd indicates a refractive index at the wavelength of the d-line, and vd indicates an Abbe number at the d-line as the central wavelength.

The distance L21 between the surface close to the mirror 114 in the relay optical system 113 and the mirror 114 along the center of the optical path is 20.0 mm, and the distance L22 between the mirror 114 and the aperture stop 115 along the center of the optical path is 30.0 mm.

Compared with the configurations in FIG. 8 and FIG. 10, the distances between the relay optical system 113 and the mirror 114 can be decreased in the configuration in FIG. 13. Decreasing the distance between the relay optical system 113 and the mirror 114 means a decrease of the value L2/f2 in expression (2). If the relay optical system 113 is closer to the mirror 114, the diameter of the focused light, that is emitted from the relay optical system 113 to the aperture stop 115, can be decreased, so the diameter of the relay optical system 113 and the diameter of the mirror 114 can be decreased.

If the diameter is too small to reach the lower limit value of expression (2), however, the relay optical system 113 and the mirror 114 contact, and if the diameter is decreased while preventing this contact, the necessary luminous flux diameter cannot be secured, and the NA of illumination decreases, as mentioned above.

In the case of the microscope 51 according to the embodiment of the present invention, the optical path P15 and the optical path P17 that passes through the ocular 76 are set so that these optical paths are approximately perpendicular to each other when viewed from the top. Therefore the direction of the light from the sample emitted from the ocular 76 to the user, and a part of the optical path of the image forming optical system 102, are approximately perpendicular to each other.

Because of this, the objective lens 120, revolver 62 and sample 90 are disposed at the right side to the eyes of the user. Therefore the user of the microscope 51 cannot only easily manipulate the adjustment element 75 and control element 91, but can also easily manipulate the focusing control and observation position adjustment control without moving the upper part of the body, and can also confirm [the sample] by a direct visual check.

In concrete terms, visibility of the objective lens 120 improves. Also controllability in switching the objective lens 120, that is accessibility to the revolver 62 for switching magnification, can be improved. Operability to replace or change the position of the sample 90 is also improved. Attachment/detachment of the reticle 103 is also easy. Since the optical element can be attached to/detached from the optical path on the front face of the main body unit 21, the upper part of the body of the user need not move when observation shifts to a replacement procedure. Therefore operability improves.

If an optical path in a lateral direction with respect to the emission optical axis of the ocular 76 is formed in the image forming optical system, as seen in the optical path P15, the length of the optical path of the image forming optical system can be increased. Therefore even if a certain focal distance is required at the least, the length to sufficiently support this requirement can be secured.

The intermediate image 901 is formed on the optical path P15, therefore the reticle 103 can be inserted into the optical path at the front face of the device. This dramatically improves controllability of the image forming optical system.

Furthermore, the distance of the optical path P16 is set to be longer than the total distance of the optical path P13 and the optical path P14. Hence the position of the ocular 76 can be higher than the stage 64, and the user can easily overlook the sample 90 placed on the stage 64 from above, if the view is shifted from the ocular 76, and fine adjustment of the position of the sample 90 can easily be checked visually, without changing the position of observing.

An equivalent visibility, controllability and operability according to the present invention can be implemented when the object lens 120 is disposed at the left of the user' eyes, and is not limited to the right side.

In other words, the optical path P13 and the optical path P14 are disposed in parallel at the right side of the optical axis of the optical path P16. However the optical path P13 and the optical path P14 may be disposed in parallel at the left side of the optical path P16. In this case, each element and lens are inverted with respect to the dashed line, which indicates the center of the optical path P16, in the configuration in FIG. 1.

Then in addition to the aperture stop 115 and field stop 116 in FIG. 1, various optical elements, including various filters (e.g. deflecting plate, fluorescent filter) which are not illustrated and are used for special observation, can be disposed on the optical path P12, that is a part of the optical path of the illumination optical system 101, at the front face side of the main body portion 21. Also various filters can be inserted into/removed from the optical path P14 of the image forming optical system 102 via the front face of the device. As a result, controllability of various optical elements improves.

When the optical path P15 of the image forming optical system 102 and the optical path P12 of the illumination optical system 101 are viewed vertically down from the top face (up) in FIG. 2, in other words, from the top face as shown in FIG. 2, which is in the direction perpendicular to the optical path P15 and the optical path P12, the optical paths are set to overlap on a same line.

Because of this, the space of the optical path must be secured only at one side when viewed from the optical axis direction of the objective lens 120. As a result, the space around the stages 64 and 65 can be saved, that is the main body portion 61 can be downsized in the lateral direction in FIG. 2.

In order to implement the above mentioned effect of improving visibility, controllability and operability, and the effect of downsizing the main body portion 61 in the lateral direction, the configuration of the optical system is not limited to the example shown in FIG. 1 to FIG. 4, but is sufficient if the following is satisfied. In other words, the above mentioned effects can be implemented if there is a part of the optical path of the illumination optical system and an optical path of the image forming optical system that is formed approximately perpendicular to the direction of light from the sample that is emitted from the ocular 76 to the user (hereafter referred to as the "second optical path") when viewed from the top, if an optical path that is approximately parallel with the second optical path is provided also in a part of the optical path of the illumination optical system, and if the optical path of the illumination optical system is set so that at least a part of the optical path of the illumination optical system and at least a part of the second optical path overlap when viewed from a predetermined direction that is perpendicular to the above mentioned optical path [that is parallel with the second optical path] and the second optical path respectively.

Embodiments of the present invention is not limited to the above mentioned embodiments, but can be modified in various ways within the scope not deviating from the spirit of the present invention.

INDUSTRIAL APPLICABILITY

As described above, a microscope, particularly an inverted microscope according to the present invention, is useful as an inspection apparatus for industrial use and as an observation apparatus for observing microstructures, and is suitable for usage for which controllability and space saving are demanded.

The invention claimed is:

1. A microscope comprising:
an illumination optical system that guides a light from a light source to a sample,
an objective lens that condenses the light from the sample illuminated by the illumination optical system,
an image forming optical system that guides the light from the objective lens to an ocular, wherein:
in a state where a user of the microscope observes the sample through the ocular, a first optical path in at least part of the image forming optical system from the objective lens is parallel or approximately parallel to a first axis running from one side of the user's right side and left side to the other, a second optical path in at least part of the illumination optical system from the light source is parallel or approximately parallel to a second axis running from one side of the user's right side and left side to the other,
the first optical path is parallel or approximately parallel to the second optical path,
a traveling direction of the light traveling in the second optical path is opposite to a traveling direction of the light traveling in the first optical path, and
a reticle is removably disposed in the first optical path.

2. The microscope according to claim 1, further comprising:
a third optical path that extends in a first direction and guides the light as an illumination light from the light source to the second optical path,
the second optical path that extends in a second direction and guides the illumination light from the third optical path to a fourth optical path,
the fourth optical path that extends in a third direction and guides the illumination light from the second optical path to the sample,
a fifth optical path that extends in the third direction and guides the light as an observation light from the sample to the first optical path,
the first optical path that extends in the second direction and guides the observation light from the fifth optical path to a sixth optical path, and
the sixth optical path that extends in the third direction and guides the observation light from the first optical path to a seventh optical path, wherein
a travel direction of the illumination light on the fourth optical path is opposite to that of the observation light on the fifth optical path,
when the microscope is viewed in a direction from a front part to a back part by the user of the microscope, which is an orthogonal direction to the second direction, the second direction is a left to right or right to left direction, and
the seventh optical path guides the observation light from the sixth optical path to the ocular in the front part of the microscope, and is directed to the user.

3. The microscope according to claim 1, wherein
at least one of an aperture stop and a field stop is disposed in the second optical path.

4. The microscope according to claim 3, wherein
the first axis is parallel or approximately parallel to the second axis and the second optical path is vertically spaced from the first optical path.

5. The microscope according to claim 3, further comprising:
an adjustment element for adjusting at least one of the aperture stop and the field stop,
wherein the adjustment element is disposed on a same side of the microscope as a side where the ocular is disposed.

6. The microscope according to claim 3, further comprising:
a filter member disposed on the second optical path.

7. The microscope according to claim 6, further comprising:
an inserting/removing element for inserting or removing the filter member on the second optical path,
wherein the inserting/removing element is disposed on a same side of the microscope as a side where the ocular is disposed.

8. The microscope according to claim 6, wherein the filter member includes at least one of a deflecting plate and a fluorescent filter.

9. The microscope according to claim 3, wherein:
the illumination optical system includes:
a first optical system into which the light from the light source is entered, and
a second optical system disposed on the second optical path, and
the second optical system includes a first deflecting element that deflects the light from the first optical system at a right or approximately right angle and at least one of the aperture stop and the field stop.

10. The microscope according to claim 9, wherein the illumination optical system includes:
- a second deflecting element that deflects the light from the second optical system, and
- a third optical system that illuminates the light deflected by the second deflecting element to the sample via the objective lens.

* * * * *